Patented Sept. 10, 1935

2,013,648

UNITED STATES PATENT OFFICE 2,013,648

PRODUCTION OF UNSATURATED ALIPHATIC ACID ESTERS

Harold J. Barrett, Wilmington, Del., assignor to E. I. du Pont de Nemours & Company, Wilmington, Del., a corporation of Delaware No Drawing. Application December 30, 1933, Serial No. 704,761

21 Claims. (Cl. 260—106)

This invention relates to the production of esters of unsaturated monocarboxylic aliphatic acids and more particularly to the manufacture thereof by dehydrohalogenating, i. e. by splitting off hydrogen chloride from alphachlormonocarboxylic aliphatic acid esters.

Methods are known for the production of unsaturated monocarboxylic aliphatic acid esters from betachlor-monocarboxylic aliphatic acid esters. Thus it has been proposed to dehydrohalogenate betachlorpropionic acid esters by heating the same with sulfuric or phosphoric acid; by treatment with a tertiary base; or by reaction with alkali metal hydroxide in the presence of alcohol. These methods and reagents are not effective, however, for dehydrohalogenation of the corresponding alphachlor esters to yield unsaturated esters.

I have now found that esters of unsaturated acid may satisfactorily be obtained by treating alphachlormonocarboxylic acid esters with ferric chloride. Thus, for example, esters of acrylic and methacrylic acids, respectively, may be prepared from alphachlorpropionic and alphachlorisobutyric acid esters. This result is the more surprising since, altho betachlorsubstituted aliphatic acids and their derivatives are generally regarded as more susceptible of dehydrohalogenation than the corresponding alphasubstitution products, betachlorpropionic and betachlorisobutyric acid esters are practically unaffected by the treatment with ferric chloride.

Generally speaking, dehydrohalogenation of the alphachlor ester may be effected by heating thereof in the liquid state with ferric chloride at a temperature of 100° C. or above. While the temperature at which the reaction is initiated varies with the specific ester used, this may be ascertained and controlled, for example, by heating the liquid ester and ferric chloride under a reflux condenser. Most satisfactorily, however, the dehydrohalogenation is combined with separation of the product by heating the materials under a fractionating column, the reflux in the latter being adjusted so that the unsaturated ester product (having a lower boiling point than the original alphachlor ester) is not returned but is led from the column, condensed and collected. The process may also be operated continuously by gradually adding fresh alphachlor ester to the reaction vessel in amount corresponding to removal of unsaturated ester. The action of the ferric chloride appears to be catalytic in nature in that a given amount of ferric chloride will suffice, without replacement or renewal, for dehydrohalogenation of many times the chemically equivalent amount of alphachlor ester. The presence of only a small amount of ferric chloride is required, altho the desired reaction will proceed with proportions thereof varying over a wide range. There is no advantage, however, in employing ferric chloride in amount initially exceeding about 5% by weight of the alphachlor ester in contact therewith, and, in fact, it has been found that very satisfactory results are obtained with about 1%.

Where large volumes of material are being handled and extended heating periods are involved a tendency for the rate of dehydrohalogenation to decrease has been observed. This would appear to be due to the poisoning effect of some unidentified impurity or by-product. This condition may be remedied by addition of fresh ferric chloride, continuously or from time to time, in such amounts as may be necessary to maintain the desired reaction rate. Where a continuous process is being operated this supplemental catalyst may advantageously be added dissolved in the "make-up" chlorester.

A further feature of the invention relates to the application of the principal thereof to the separation of alpha- and beta-chlormonocarboxylic aliphatic acid esters. For example, the production of chlorisobutyric acid esters is most readily accomplished by chlorinating isobutyric acid and esterifying the product. This chlorination yields, under a wide variety of conditions, a mixture of alpha- and beta-chlor acids. In accordance with the present invention it is possible to effect a satisfactory separation of betachlor acid esters from alphachlor acid esters, taking advantage of the newly observed fact that the latter are and the former are not capable of dehydrohalogenation with ferric chloride.

Thus a mixture of the chlor acids may be esterified, e. g. by refluxing with sulfuric acid and the appropriate alcohol, and the mixture of distilled esters can then be treated with ferric chloride in accordance with the invention. In this way the alphachlor esters are substantially completely dehydrohalogenated and the betachlor esters are unchanged. The latter may be recovered and used for any purpose, notably for dehydrohalogenation to the unsaturated acid esters by heating with a caustic alkali in the presence of an alcohol or other method.

The following examples will serve to illustrate the invention, altho it is to be understood that the invention is not limited thereto:

*Example 1.*—To 136.5 g. of methyl alphachlorisobutyrate was added 16.2 g. of anhydrous ferric chloride. The mixture was heated under a 4 ft. fractionating column, a distillate boiling from 98–108° C. being collected over a period of about 4 hours. The yield of crude methyl methacrylate was about 83% of the theoretical.

Example 2.—Methyl methacrylate may be prepared on a larger scale as follows: Methyl alphachlorisobutyrate is dehydrohalogenated by being refluxed in the presence of 1% anhydrous ferric chloride. A 4 liter glass pot, heated by an oil bath and connected to 1.5 in. x 5 ft. carborundum-packed glass column, is used. A constant feed device is arranged to deliver about 600 cc. per hour of chlorester-ferric chloride solution. Dehydrohalogenation is begun with the pot half full of chlorester containing 1% ferric chloride and as soon as distillate begins to pass from the column (head temperature 100–105° C.) feed of chlorester-ferric chloride is begun so that the original liquid level is maintained. This corresponds approximately to a 3-hour time of contact. The distillate is condensed in or washed with sodium carbonate solution (to neutralize hydrochloric acid) and purified by fractional distillation; yields of about 90% of theory are obtained. The process may be continued without interruption until cleaning out of the pot is necessitated by accumulation of ferric chloride and tarry matter.

Example 3.—If, in the preceding example, a mixture of alpha- and betachlorester be used, the latter is substantially unaffected and accumulates in the reaction vessel residue, from which it may readily be recovered by distillation.

Example 4.—A batch of 1000 g. ethyl alphachlorisobutyrate containing 1% ferric chloride was heated in a 3 liter flask under a 42 in. distilling column with adjustable take-off. Heating and reflux were adjusted in such a manner that distillate was taken off between the temperatures of 113 and 118° C. throughout the greater part of the reaction. As the reaction progressed a quantity of 2000 g. ethyl alphachlorisobutyrate containing 1% ferric chloride was slowly introduced into the reaction flask at such a rate that the liquid level was kept practically constant. The distillate was caught in a dark bottle containing hydroquinone (to inhibit polymerization). An amount of 2128 g. distillate was obtained below 118° C. This material was washed with sodium carbonate solution, dried over sodium sulfate, and fractionated. On fractionation, 1090 g. ethyl methacrylate (B. P. 118–119° C.) was obtained along with about 800 g. unchanged ethyl alphachlorisobutyrate.

Example 5.—Methyl acrylate may be prepared in the same general manner set forth in the preceding examples when 100 parts by weight of methyl alphachlorpropionate and 2 parts anhydrous ferric chloride are heated in a glass vessel under a fractionating column. The rate of heating and taking off of material from the head of the column are regulated so that the distillate contains a high proportion of methyl acrylate and the chlorester is returned to the still pot for further reaction.

The process may be carried on at pressures above or below atmospheric, but atmospheric pressure operation is preferred.

Various changes may be made in the method described without departing from the invention or sacrificing any of the advantages thereof.

I claim:

1. Process for producing esters of unsaturated monocarboxylic aliphatic acids which comprises dehydrohalogenating a saturated alphachlormonocarboxylic aliphatic acid ester with ferric chloride.

2. Process for producing esters of unsaturated monocarboxylic aliphatic acids which comprises dehydrohalogenating a saturated alphachlormonocarboxylic aliphatic acid ester in the liquid phase with ferric chloride.

3. Process for producing esters of unsaturated monocarboxylic aliphatic acids which comprises refluxing a saturated alphachlormonocarboxylic aliphatic acid ester in the presence of ferric chloride.

4. Process for producing esters of unsaturated monocarboxylic aliphatic acids which comprises dehydrohalogenating a saturated alphachlormonocarboxylic aliphatic acid ester in the liquid phase in the presence of up to about 5% by weight of ferric chloride.

5. Process for producing esters of unsaturated monocarboxylic aliphatic acids which comprises dehydrohalogenating a saturated alphachlormonocarboxylic aliphatic acid ester in the liquid phase in the presence of about 1% by weight of ferric chloride.

6. Process for producing esters of unsaturated monocarboxylic aliphatic acids which comprises heating a saturated alphachlormonocarboxylic aliphatic acid ester in the presence of ferric chloride, to ebullition, fractionally condensing unreacted alphachlor monocarboxylic aliphatic acid ester from the resultant vapor and returning said ester to the heating zone, while condensing from the residual vapor at a lower temperature and separately collecting the dehydrohalogenated alphachlormonocarboxylic aliphatic acid ester.

7. Process as in claim 6 wherein fresh alphachlor monocarboxylic aliphatic acid ester is added substantially in proportion to the rate at which dehydrohalogenated alphachlor monocarboxylic aliphatic acid ester is removed.

8. Process as in claim 6 wherein fresh alphachlor monocarboxylic aliphatic acid ester containing dissolved ferric chloride is added substantially in proportion to the rate at which dehydrohalogenated alphachlor monocarboxylic aliphatic acid ester is removed.

9. Process for producing esters of methacrylic acid which comprises dehydrohalogenating an alphachlorisobutyric acid ester with ferric chloride.

10. Process for producing esters of methacrylic acid which comprises refluxing an alphachlorisobutyric acid ester in the presence of ferric chloride.

11. Process for producing esters of methacrylic acid which comprises dehydrohalogenating an alphachlorisobutyric acid ester in the liquid phase in the presence of up to about 5% by weight of ferric chloride.

12. Process for producing esters of methacrylic acid which comprises heating an alphachlorisobutyric acid ester, in the presence of ferric chloride, to ebullition, fractionally condensing unreacted alphachlor isobutyric acid ester from the resultant vapor and returning said ester to the heating zone, while condensing from the residual vapor at a lower temperature and separately collecting the dehydrohalogenated alphachlor isobutyric acid ester.

13. Process for the separation of alpha- from betachlorisobutyric acid esters which comprises dehydrohalogenating a mixture thereof with ferric chloride and separating the resultant methacrylic acid ester from the unchanged betachlorisobutyric acid ester.

14. Process for producing methyl methacrylate which comprises dehydrohalogenating methyl alphachlorisobutyrate with ferric chloride.

15. Process for producing methyl methacrylate which comprises dehydrohalogenating methyl alphachlorisobutyrate in the liquid phase with ferric chloride.

16. Process for producing methyl methacrylate which comprises refluxing methyl alphachlorisobutyrate in the presence of ferric chloride.

17. Process for producing methyl methacrylate which comprises dehydrohalogenating methyl alphachlorisobutyrate in the liquid phase in the presence of up to about 5% by weight of ferric chloride.

18. Process for producing methyl methacrylate which comprises dehydrohalogenating methyl alphachlorisobutyrate in the liquid phase in the presence of about 1% by weight of ferric chloride.

19. Process for producing methyl methacrylate which comprises heating methyl alphachlorisobutyrate in the presence of ferric chloride, to ebullition, fractionally condensing unreacted methyl alphachlor isobutyrate from the resultant vapor and returning said ester to the heating zone, while condensing from the residual vapor at a lower temperature and separately collecting the dehydrohalogenated methyl alphachlor isobutyrate.

20. Process as in claim 19 wherein fresh methyl alphachlor isobutyrate is added substantially in proportion to the rate at which dehydrohalogenated methyl alphachlor isobutyrate is removed.

21. Process as in claim 19 wherein fresh methyl alphachlor isobutyrate containing dissolved ferric chloride is added substantially in proportion to the rate at which dehydrohalogenated methyl alphachlor isobutyrate is removed.

HAROLD J. BARRETT.